Aug. 21, 1928.  W. C. WARD  1,681,202
SAFETY APPLIANCE FOR AEROPLANES
Filed Sept. 12, 1927
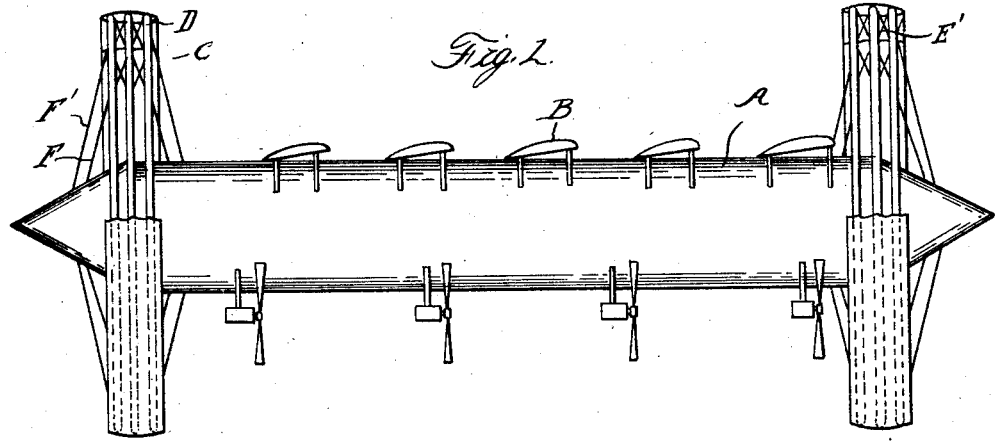
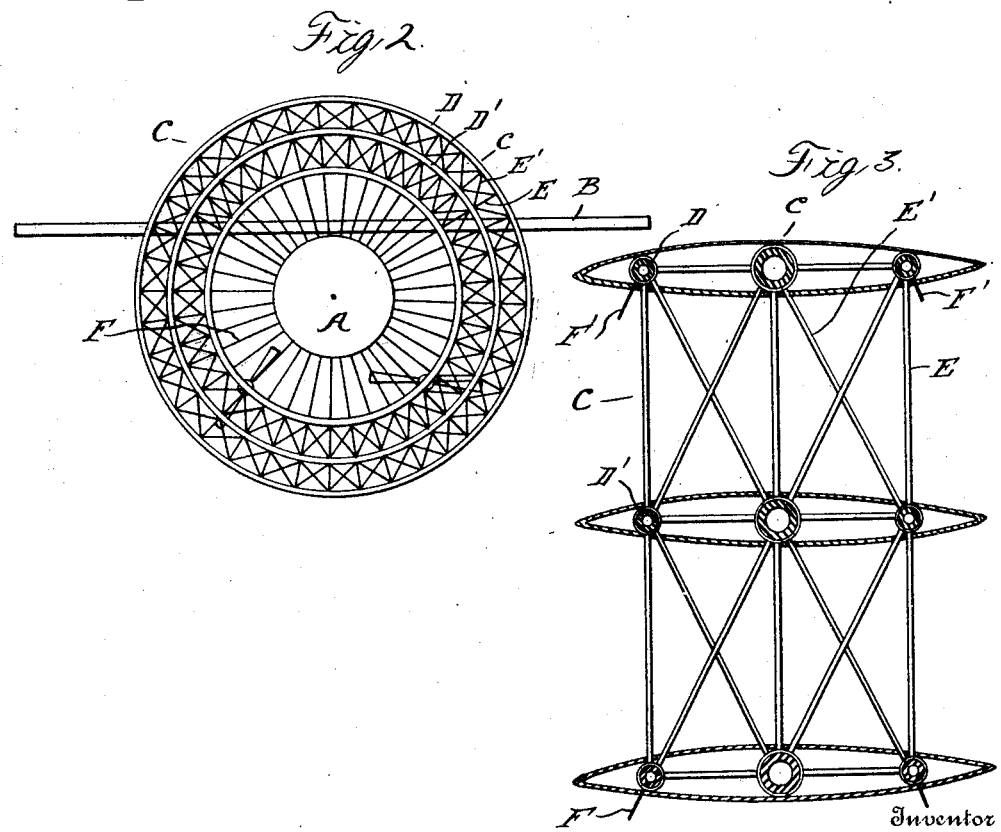
Inventor
Willis C. Ward
By Whittemore Hulbert
Whittemore & Belknap
Attorneys Patented Aug. 21, 1928.

1,681,202

UNITED STATES PATENT OFFICE.

WILLIS C. WARD, OF ORCHARD LAKE, MICHIGAN.

SAFETY APPLIANCE FOR AEROPLANES.

Application filed September 12, 1927. Serial No. 219,029.

It is the object of the invention to lessen the destructive effect caused by the impact of a falling plane. To this end the invention consists in the peculiar construction of cushioning means used for this purpose.

In the drawings;

Figure 1 is a diagrammatic side elevation of an aeroplane to which my improvement is applied.

Figure 2 is a cross section thereof.

Figure 3 is an enlarged cross section through the cushioning means.

A is the fuselage of an aeroplane or other heavier than air flying machine and B are the wings thereof these parts being only represented diagrammatically. C is my safety appliance which is of the following construction:

Surrounding the fuselage and arranged at one or more points in the length thereof is a circular skeleton frame. This is preferably formed of a series of inflated annular tubes D, D' etc., which are connected by radial and diagonal cross braces E, E'. There are also a series of tension spokes F, F' for attaching the structure to the fuselage or any suitable part of the frame. The tubes D may be formed of tire fabric and are inflated with comparatively high pressure air so as to normally hold their circular shape.

The structure as described is made to offer as slight resistance as possible to the air by the stream lining of the tubes braces and spokes in a direction longitudinally of the machine or in the direction of flight as indicated in Figure 3. Thus the normal operation of the machine is not greatly retarded or otherwise interfered with. In case of an accident and falling of the plane the safety appliance C will first come in contact with the ground whatever the position the machine may be falling in and through the cushioned effect will lessen the destruction. It is, of course, to be understood that no attempt is made to save the plane from wreckage if the fall is from a considerable height but the resistance to the collapsing of the structure C may effect sufficient cushioning to save human life.

What I claim as my invention is:

1. The combination with an aeroplane having a fuselage, of cushioning means surrounding said fuselage comprising annular inflated tubes and a skeleton framework connecting said tubes with the body of the fuselage.

2. The combination with an aeroplane provided with a fuselage, of a cushion therefor comprising a series of annular inflated tubes surrounding the fuselage, braces connecting said tubes with each other and spokes connecting said tubes with the body of the fuselage.

In testimony whereof I affix my signature.

WILLIS C. WARD.